Figure 1:
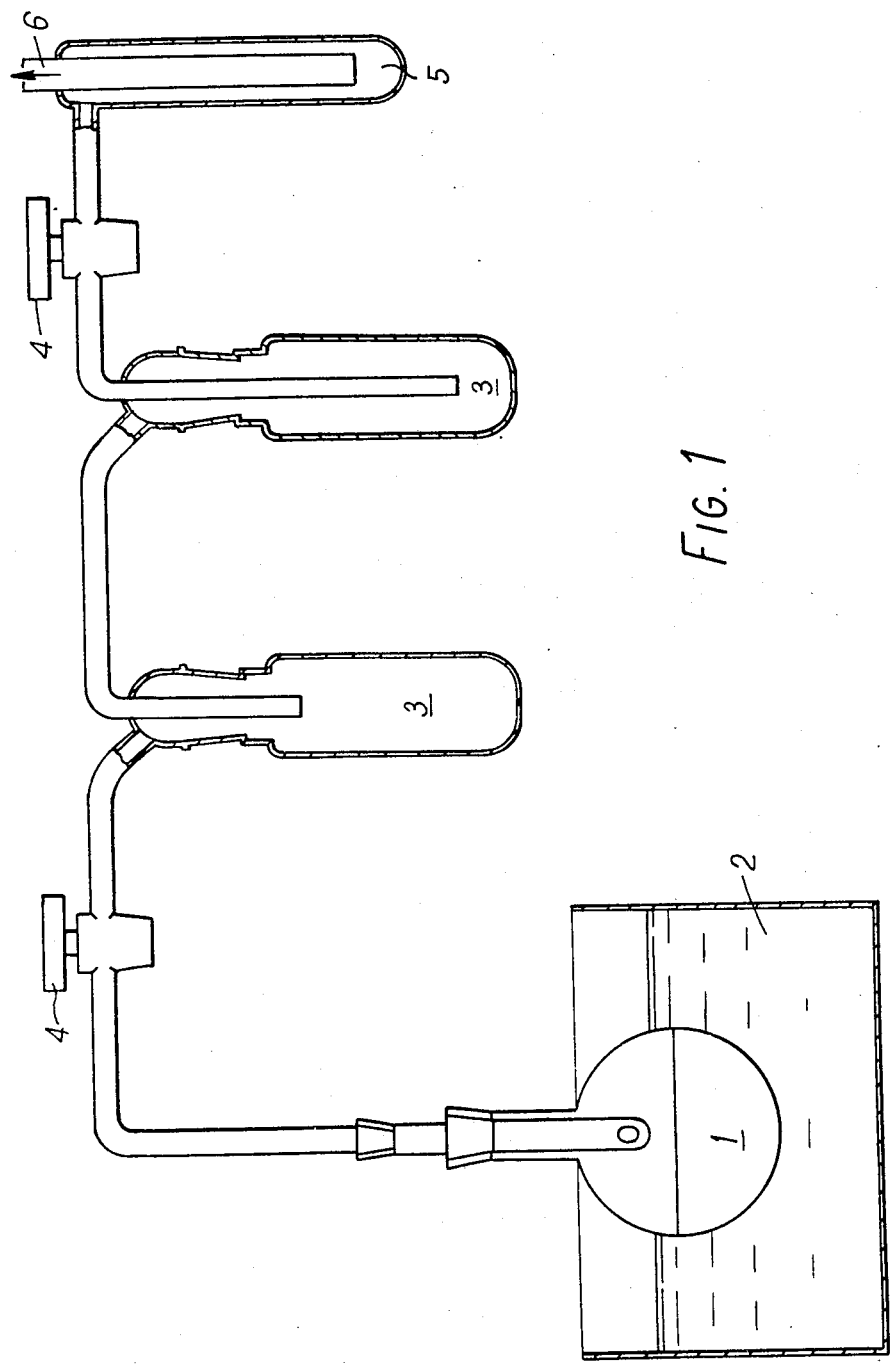

United States Patent [19]

Laws et al.

[11] 3,979,527

[45] Sept. 7, 1976

[54] PREPARATION OF HOP OIL

[75] Inventors: Derek Roy James Laws; John Anthony Pickett, both of Nutfield, England

[73] Assignee: Brewing Patents Limited, England

[22] Filed: Apr. 29, 1975

[21] Appl. No.: 572,703

[30] Foreign Application Priority Data

June 11, 1974 United Kingdom............... 25944/74
Oct. 8, 1974 United Kingdom............... 43642/74

[52] U.S. Cl................................ 426/592; 426/431; 426/476; 426/492; 426/600
[51] Int. Cl.² ......................................... C12C 3/00
[58] Field of Search ........... 426/600, 476, 651, 431, 426/16, 29, 386, 387, 489, 592, 492–494

[56] References Cited
UNITED STATES PATENTS 3,155,522  11/1964  Hildebrand et al.................. 426/600

OTHER PUBLICATIONS

Howard "Composition and Brewing Value of Hop Oil" J. Institute Brewing, vol. 70, pp. 60–61.

Primary Examiner—A. Louis Monacell
Assistant Examiner—R. B. Penland
Attorney, Agent, or Firm—Wenderoth, Lind & Ponack

[57] ABSTRACT

An improved method of making hop oil is described involving steam distilling the hop oil under vacuum at a temperature not exceeding 50°C. The distillate can be collected by cooling to less than −20°C. The collected distillate or hop oil extracted therefrom can be used in beer making processes to give beer having a hop character very similar to that obtained by dry hopping.

16 Claims, 2 Drawing Figures

PREPARATION OF HOP OIL

This invention is concerned with the production of an improved hop oil preparation.

Hops can be used in the brewing process to impart a bitter flavour and hop character to beer. The bitter flavour is derived from the hop resin constituents, whilst the more volatile hop oil constituents are mainly responsible for hop character. By "hop character" we mean the aroma and flavour imparted to beer by the essential oil of hops. The hop oil, which can be readily steam distilled, constitute 0.5 to 2.0% of the dry weight of hop cones and consist of a hydrocarbon fraction (mainly mono- and sesqui-terpenes) and an oxygenated fraction (esters, alcohols, etc.). Hence when hops are added to the copper at the start of boiling nearly all of the hop oil constituents are lost with the steam. In order to impart a hop character to beer it is accepted brewing practice to add hop cones or powdered hops to beer in conditioning tanks or casks. Alternatively, hop character can be imparted to beer by restricting evaporation of the hop oils during wort boiling. The process of adding hops to conditioning tanks or casks is known as "dry hopping" beer and this procedure does not lend itself to modern production methods because:

a. Long contact times (up to 3 weeks) are necessary to impart the full hop aroma to the beer.
b. It is difficult to control the degree of dry hopping on a commercial scale.
c. There are difficulties in emptying and cleaning the tanks and casks after dry hopping.

A more convenient method of imparting a hop character is to add one of the commercially available hop oil preparations to beer. Such products are usually obtained by steam distilling hops at atmospheric pressure and removing the oil from the aqueous distillate. However, these hop oil preparations do not usually impart the same hop character to beer as do dry hops. The use of hop oil preparations is often associated with an unpleasant oily and sulphury character which develops in the beer. Hence hop oil preparations are only used to a limited extent in commercial brewing practice.

The hydrocarbon fraction of hop oil is less soluble in beer than is the oxygenated fraction. Beers that have been dry hopped will contain a different ratio of oxygenated constituents to hydrocarbon constituents from beers which have been treated with steam distilled hop oil, since some of the less soluble hydrocarbon constituents will remain in the hop cones. It has recently been demonstrated that some of the volatile constituents which are present in hops undergo chemical transformation during steam distillation. Thus a number of hydrocarbon constituents are formed during the steam distillation of certain terpenoid esters. These esters can also rearrange during the distillation to give other oxygenated compounds. These variations contribute to the difference in aroma of beers treated with steam distilled hop oil preparations and dry hops, respectively, because of the low taste thresholds of many of the compounds involved.

Recent work has shown that hop oil preparations obtained by steam distillation can contain a large number of sulphur-containing compounds. These compounds contribute to some "off" flavours in beer (e.g. cooked vegetable character) which has been treated with these hop oil preparations.

The present invention is concerned with a method of obtaining a hop oil preparation which contains a lower level of both sulphur-containing compounds and hydrocarbon constituents than is present in hop oil preparations obtained by steam distillation of hops at atmospheric pressure. The main advantage of using the hop oil preparation obtained by this new process in brewing is that after a short contact time it produces a hop aroma which is almost identical to the hop aroma of beer which has been dry hopped with hop cones. Detailed flavour studies have shown that beers dry hopped with a wide variety of hops were very similar to beers treated with the hop oil preparations obtained from the same varieties by the process of the present invention.

When hops are steam distilled for long periods, which is normal commercial practice for obtaining a hop oil preparation, the hop resin constituents undergo complex chemical transformations which results in the bittering potential of the hops being destroyed. An additional advantage of obtaining hop oil by the new process is that the bittering potential of the hops is not destroyed. Hence the hops can be used to bitter beer after the oils have been extracted.

The present invention accordingly provides a method for the production of hop oil which comprises steam distilling hop oil in admixture with water from hops under vacuum at a temperature not exceeding 50°C and collecting the distillate. Within the method of the invention we contemplate that one of two possible procedures will be employed and these form subsidiary aspects of the invention. In a first subsidiary aspect the invention comprises distilling the hop oil in admixture with water, from hops in contact with water. In a second and preferred subsidiary aspect the invention comprises distilling the hop oil in admixture with water from hops in an atmosphere of steam, preferably by passing a stream of steam over the hops, at a temperature of less than 50°C. The hops are preferably in a shredded, milled or ground form. This is preferably done so that the hops are, apart from the removal of hop oil, retained substantially in their original condition.

If the distillation is carried out at a temperature greater than 50°C then no substantial elimination of the hydrocarbon and in particular the sulphur-containing fractions from the desired hop oil fraction is obtained.

At such temperatures some terpenoid esters will undergo certain chemical transformations. It is preferred that the distillation be performed at a temperature not exceeding 30°C. Temperatures in the range 10° to 30°C are generally suitable with an optimum practical figure of about 25°C (bath); the temperature of the steam being a few degrees lower.

Since the distillation is performed at a relatively low temperature the distillate is best collected in a cooled trap. In order to maximise yields the temperature to which the distillate is cooled should be as low as conveniently possible. Temperatures below −20°C are preferred for this purpose. Cooling the distillate collection vessels in acetone/solid $CO_2$ baths produces temperatures of about −78°C. This is a convenient way of obtaining a suitably low temperature.

In order to be able to perform this distillation at the temperatures described the distillation system will typically be evacuated to a pressure in the range 0.01 to 5 mm Hg. The pressure used will depend both on the temperature at which the hop oil/water mixture is distilled off the hop/water mixture and the temperature to which the receiving vessel is cooled.

In order to facilitate extraction of hop oil from the hops it is preferred to shred or grind the hops to increase the contact with the water or water vapour. Thus, the hop oil is usually distilled from a slurry of finely divided hops mixed with water or by passing steam through a column of finely divided hops.

Since, in general, the distillate will be collected at temperatures substantially below 0°C, the immediate product will be ice in which the hop oil is dispersed. This solid dispersion can be thawed and used directly as an additive to beer. It is convenient to treat the thawed mixture in a homogeniser (Manton-Gaulin homogeniser, A.P.V. Company, Crawley, Surrey) before it is added to beer. The emulsion of hop oil and water can be given additional stability by the addition of a small quantity of the sodium or potassium salts of iso-$\alpha$-acids to the mixture before it is placed in the homogeniser. Optionally, the hop oil can be separated from the water, for example by solvent extraction e.g. with ether, or by centrifugation, to give a concentrated or pure form of the oil. The concentrated or pure hop oil can then be used as an additive as such or dissolved in a suitable organic solvent e.g. ethanol. Typically the hop oil will be added to beer to give a concentration of from 0.05 to 5, preferably 0.4 to 2 ppm of hop oil in the beer. We have found that in scaling the process of the invention from the laboratory to pilot plant scale that the amount of water collected is reduced when extracting the same quantity of oil. As is mentioned above the hop residue remaining after distillation of the hop oil can be used for bittering beer. In the first subsidiary method the hop residue will be in the form of an aqueous slurry of finely divided hops. This slurry, or the residual hops after filtration or otherwise removing the water, can be used to bitter beer e.g. by adding it to wort in the copper. In the second subsidiary method the hop residue is a relatively dry solid rarely containing more than 15% moisture. By shutting off the source of steam from the hops at the end of the distillation the residual moisture level is normally about 6%. These hops can readily be used in brewing processes. We have found that the bittering potential of hops extracted by this preferred method of the invention is substantially the same as hops which have not been extracted. Because they are in a readily handlable form the relatively dry extracted hops can be used to bitter beer by direct addition to the copper or by first extracting them with an organic solvent to give an extract which can be added to the copper or by compressing the milled hops to give cakes or pellets which could then be added to the copper.

The relatively dry form of extracted hop produced by the preferred method makes this method economically advantageous compared with the first 'wet' distillation method. This is particularly true with the present relatively high cost of hops.

Analysis has shown that there is a reduction of up to 25% in the amount of hydrocarbon constituents present in the oil obtained by the new process when operated at 10° – 30°C compared with the amount present in conventionally steam distilled oil. Gas liquid chromatographic studies have shown that there is a general reduction in the levels of all of the major constituents of the hydrocarbon fraction and no single compound is removed by the process.

Examination of hop oil by gas liquid chromatography, using a flame photometric detector, has shown that commercial samples usually contain at least six sulphur-containing compounds. Oil produced by the new process was examined in this way and shown to contain up to 90% less sulphur-containing compounds than is present in hop oil steam distilled at atmospheric pressure.

Generally, in the process of the invention the yield will be chosen as up to 50%, but usually from 15 to 40%, of the total hop oil present in the hops. This deliberate restriction on gross yield can be used to minimise the distillation of undesired compounds.

We have found that the method of the invention can be used satisfactorily to extract hop oil of high quality from a wide range of hops including the types: Petham Goldings, Wye Target, Cobbs Goldings, Bramling Cross, Fuggles, Northern Brewer and Styrian Goldings. The particular type of hop is thus not believed to be critical to the invention but, of course, different varieties will give different yields of hop oil. The precise nature of the hop oil derived from a particular variety of hop is characteristic of the variety.

Figure 2:
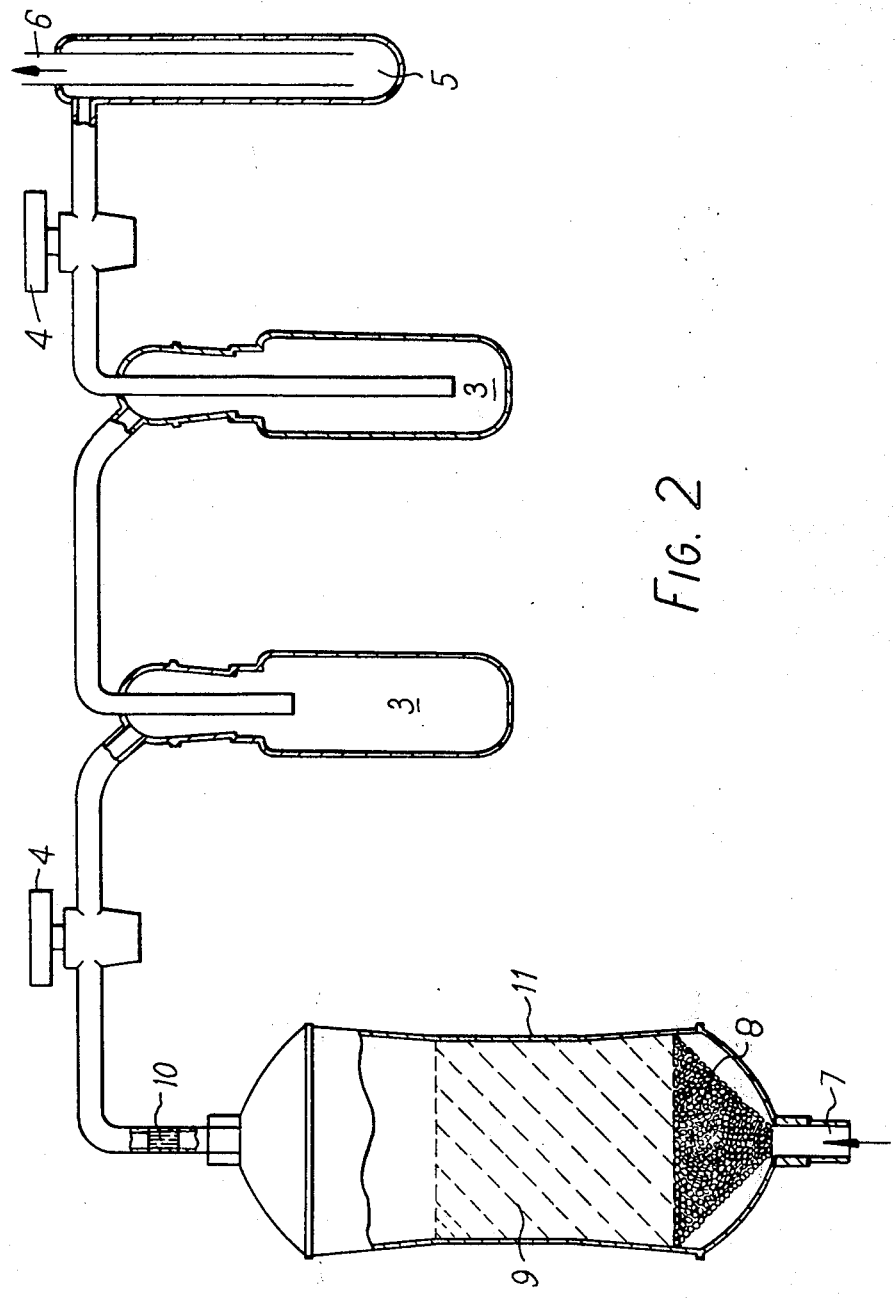

The invention will be described further with reference to the accompanying drawings in which:

FIG. 1 is a diagram of apparatus suitable for operating the first subsidiary method of the invention, and FIG. 2 is a diagram of apparatus suitable for operating the second and preferred subsidiary method of the invention.

In FIG. 1 a mixture of milled hops and water 1 in a suitable vessel is placed in a water bath 2 maintained at about 25°C. The vessel containing the hop/water mixture is connected to a vacuum system comprising taps 4, cooled distillate traps 3, a cooled trap 5 and vacuum pump (not shown) connected to pipe 6. To steam distil the hop oil the system is evacuated usually to a pressure of about 0.02 mm Hg with taps 4 open. Traps 3 are cooled to collect the distillate usually in acetone/solid $CO_2$ baths to give a temperature of about −78°C. Trap 5 is cooled in liquid nitrogen to prevent damage to the pump from materials which might otherwise be carried over into the pump. The distillate can conveniently be removed from the vacuum line by closing the taps 4 and venting the traps 3 to the atmosphere. When the traps 3 are replaced in the line the tap nearest the pump is opened first and the traps re-evacuated before reconnecting them via the second tap to the distillation vessel.

In FIG. 2 milled hops 9 are placed in vessel 11 resting on glass beads 8. Steam at about 20°C is produced in a boiler immersed in a bath at 25°C (not shown) and introduced at inlet 7. A plug of glass wool 10 is placed in the line out of vessel 11 to prevent spray or small fragments of hop from entering the vacuum line proper. The vacuum line shown as taps 4, traps 3, trap 5 and pump connection 6 operates as described in connection with FIG. 1. At the end of the distillation the milled hops can be further dried by shutting off a tap (not shown) in line between the boiler and vessel 11.

The following Examples illustrate the invention:

EXAMPLE 1

Golding hops (400 g) from the 1973 growth were ground and mixed with distilled water (7.0 l.) using an Atomix Blender. The resulting slurry was placed in a round bottomed flask and connected up as in FIG. 1. Hop oil was steam distilled at 25°C (bath) and 0.02 mm Hg and collected in the cooled traps.

Distillation was continued until 3.5 l. of the thawed mixture had been collected. The aqueous extract of hop oil thus obtained was extracted three times with redistilled ether (500 ml, A.R. grade) and the combined extracts dried over dehydrated magnesium sulphate. The mixture was filtered and the filtrate was placed in a flask which was cooled in an ice-water bath. Ether was then removed from the cooled extract at a water pump. The ether content of the product was monitored using gas-liquid chromatography. The product (0.7 g) was dissolved in food grade ethanol (28 ml) and added to casks of beer (70 gall) at conditioning. The beer was conditioned for 7 days and then bottled. After pasteurization the beer was found to have a marked hoppy character.

EXAMPLE 2

The aqueous emulsion (3.5 l.) was obtained from an extraction of ground hops as described in Example 1. A portion of this extract (106 ml) was injected into beer (12 l.) running through a main leading to the bottling machine. The beer was bottled and pasteurized and found to have a pleasant hoppy character.

Beers flavoured by the processes described in Examples 1 and 2 were studied by a flavour profile procedure (see J. F. Clapperton, J. Inst. Brewing, 1973, 79, 495). Using this procedure the flavours of these beers were compared with similar beers which had been treated with dry hops and commercial steam distilled hop oil respectively. The results of the profile tests showed that the hoppy character of the beers treated with the new hop oil preparations were similar to the beer that had been dry hopped. However, the beer treated with the steam distilled hop oil had a reduced hoppy flavour and a marked sulphury and cabbagy character.

EXAMPLE 3

A sample of the slurry (59.0 g) which remained after extracting oil from the hops as described in Example 1 (6.1 g of hops present in the slurry) was added to unhopped wort (2.0 l.). The mixture was boiled under reflux for 1.5 h and then cooled to room temperature. The analytical bitterness of the wort was estimated using the standard procedure (see The E.B.C. Scale of Bitterness, J. Inst. Brewing, 1967, 73, 525) and shown to have a value of 80.5 E.B.C. units.

In a similar experiment Golding hops (6.1 g) were added to unhopped wort (2.0 l.) and the mixture was refluxed for 1.5 h. The analytical bitterness of the cooled wort was estimated and shown to be 76.7 E.B.C. units.

During the extraction of the oil, by the new process described in Example 1, the potential bitter substances present in the hops do not undergo any extensive chemical degradations. Hence, after this treatment these ground hops can be used to bitter beer.

EXAMPLE 4

Golding hops (200 g) from the 1973 growth were ground in a Wiley Mill and packed in a glass column (Q.V.F. 50 × 8 cms) between plugs of glass wool. The apparatus used was similar to that shown in FIG. 2 and evacuated to 0.02 mm of Hg. Steam at about 20°C was passed through the hops and a mixture of water and volatile components of hops began to collect in the traps which were cooled to −78°C. Distillation was continued until 2.5 l of the mixture had been collected.

The distillate was thawed and treated as described in Example 1 and 0.4 g of oil was obtained.

The hop oil obtained was of similar high quality to that obtained in Example 1. The solid hop residue remaining in the column had substantially the same bittering potential as untreated hops.

EXAMPLE 5

Example 1 was repeated using Wye Target hops (200 g) from the 1973 growth. The results were similar to those obtained in Example 4 and 0.3 g of oil was obtained.

EXAMPLE 6

Wye Target hops (500 g) from the 1974 growth were ground in a Wiley mill (1 mm screen) and packed in a glass column (Q.V.F. 30 × 16 cm). The apparatus used is as illustrated in FIG. 2 and evacuated to 0.02 mm of Hg. Steam at about 20°C was passed through the hops and the mixture of water and volatile components of hops began to collect in the traps which were cooled to −78°C. Distillation was continued until 700 ml of the mixture had been collected. The mixture was thawed and the emulsions present in the two traps combined. The emulsion contained 0.8 g of hop oil. Five samples of Wye Target hops were extracted using this procedure and the emulsions were combined. A portion (590 ml; containing 1146 ppm of hop oil) was added to 13.5 hl. of centrifuged beer in a conditioning vessel to give a concentration of 0.5 ppm. The beer was stirred, allowed to stand for 1 hour and then filtered through a sheet filter into casks. The flavour of this beer was compared with a control, which had not been treated with hop oils using:

1. A flavour profile procedure (see J. F. Clapperton, J. Inst. Brew., 1973, 79, 495).
2. A commercial brewery taste panel.

These taste tests showed that the beer treated with the hop oil had a marked hoppy character. The flavour profile of this beer was similar to profiles obtained from beers which had been dry hopped with Wye Target hops.

EXAMPLE 7

Example 6 was repeated using 500 g samples of the following hops:
a. Northern Brewer
b. Goldings
c. Styrian In each case a satisfactory oil was obtained which imparted a pleasant hop character to beer.

EXAMPLE 8

Two beers were brewed on the pilot scale (59 l.) using a standard brewing procedure. (See J. R. Hudson and S. E. Birtwistle, J. Inst. Brew. 1966, 72, 43). One beer was bittered by the addition of milled Wye Target hops (65 g) to the copper at the start of wort boiling. The other beer was bittered with a similar quantity of Wye Target hops which had been previously treated as described in Example 6. The analytical bitterness of both the worts and beers was estimated using the standard procedure (see the E.B.C. Scale of Bitterness, J. Inst. Brew. 1967, 73, 525) and shown to be similar (see Table 1).

Table 1

| | Wort Bitterness (E.B.U.) | Beer Bitterness (E.B.U.) |
|---|---|---|
| Control | 43 | 26 |
| Treated | 44 | 27 |

These beers were considered to be of equivalent bitterness, when evaluated by taste using a triangular taste test (see K. Bengtsson, Wallerstein Lab-Comm., 1953, 16, 231).

What we claim is:

1. A method for the production of hop oil which comprises steam distilling hop oil in admixture with water from hops under vacuum at a temperature not exceeding 50°C for a period of time sufficient to extract not more than 50% of the total hop oil present in the hops and collecting the distillate at a temperature not exceeding −20°C, thereby substantially reducing undesired hydrocarbons and sulphur containing compounds present in said hop oil.

2. A method as claimed in claim 1 comprising distilling the hop oil in admixture with water from hops in contact with water.

3. A method as claimed in claim 1 comprising distilling the hop oil in admixture with water from hops in an atmosphere of steam.

4. A method as claimed in claim 3 wherein the distillation is performed by passing a stream of steam over the hops.

5. A method as claimed in claim 1 wherein the temperature does not exceed 30°C.

6. A method as claimed in claim 5 wherein the temperature is about 25°C.

7. A method as claimed in claim 1 wherein the hops are finely divided.

8. A method as claimed in claim 1 wherein the distillate is collected at about −78°C.

9. A method as claimed in claim 1 wherein the vacuum is maintained by pumping to a pressure of from 0.01 to 5 mm Hg.

10. A method according to claim 1 wherein the distillation is carried out for a period of time sufficient to extract from 15-40% of the total hop oil present in the hops.

11. Hop oil made by the method claimed in claim 1.

12. Hop oil as claimed in claim 11 in the form of an aqueous dispersion or emulsion, or a solution in an organic solvent.

13. A method of making beer comprising adding to brewed beer, hop oil made by the process claimed in claim 1, in an amount sufficient to give a concentration of from 0.05 to 5.0 parts per million of hop oil in the beer.

14. A method for the production of hop oil which comprises passing a stream of steam over finely divided hops at a temperature not exceeding 50°C and under a vapor pressure of water at that temperature for a period of time sufficient to extract not more than 50% of the total hop oil present in the hops and collecting the distillate at a temperature not exceeding −20°C, thereby substantially reducing undesired hydrocarbons and sulphur containing compounds present in said hop oil.

15. A method as claimed in claim 14 wherein the temperature of the steam does not exceed 30°C.

16. A method as claimed in claim 14 wherein the distillation is carried out for a period of time sufficient to extract from 15 to 40% of the total hop oil present in the hops.

* * * * *